April 22, 1930.　　　　P. C. STAUP　　　　1,755,277
SEPARATING AND GRADING MACHINE
Filed June 7, 1927　　　2 Sheets-Sheet 1
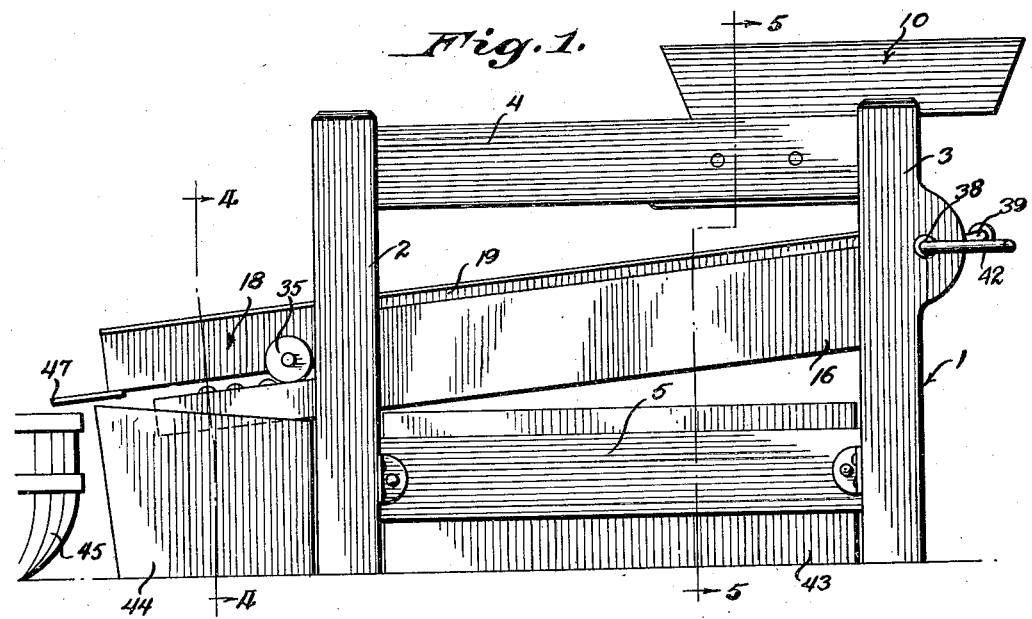
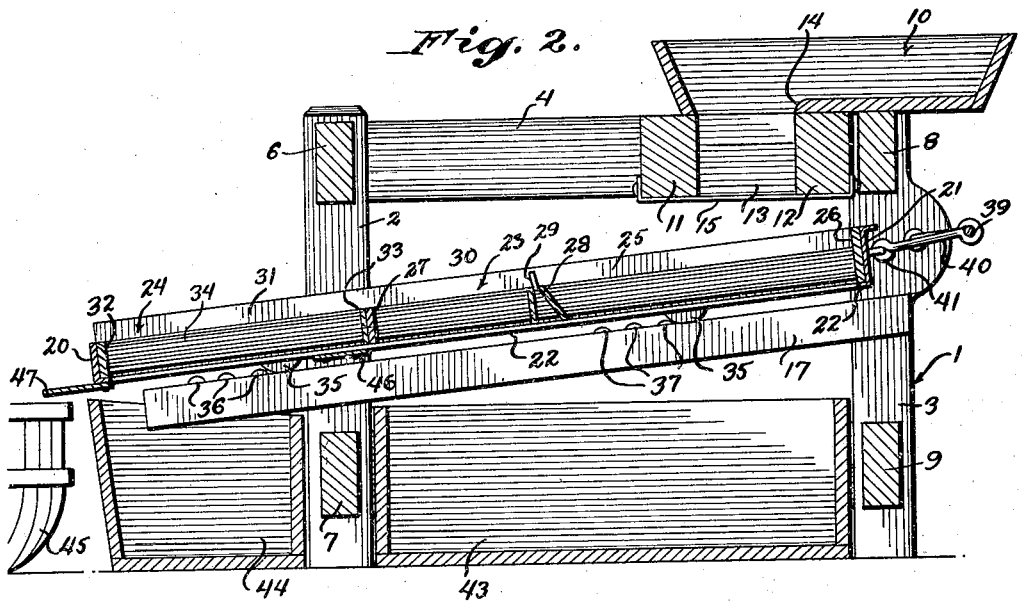
Peter C. Staup, INVENTOR.
BY Richard B. Owen, ATTORNEYS.

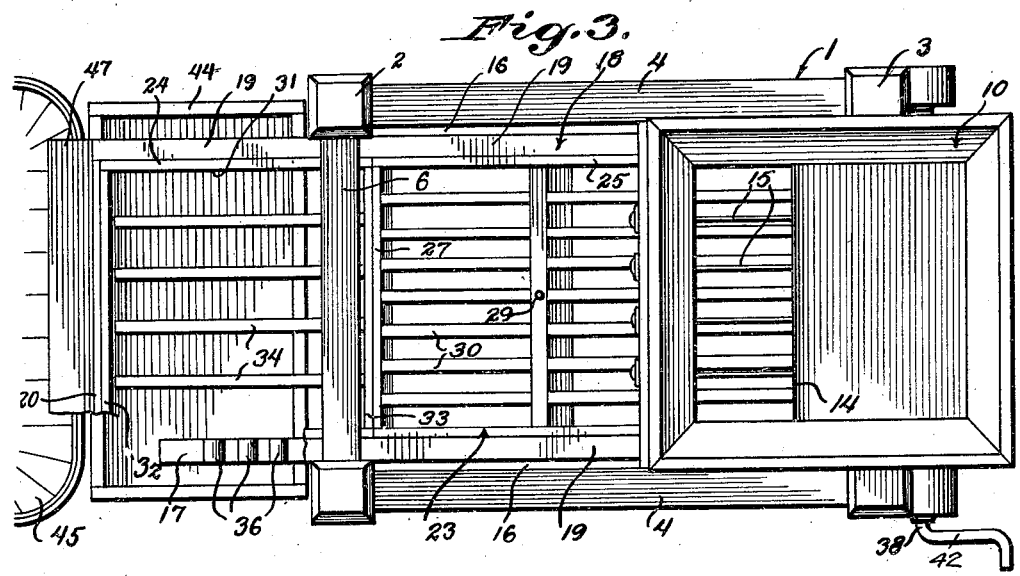
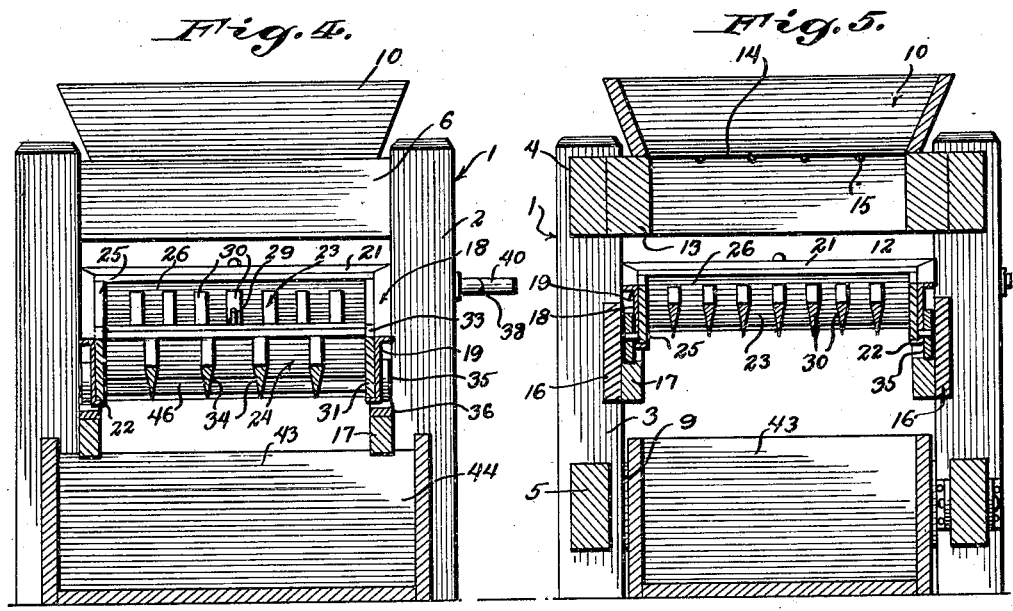

Patented Apr. 22, 1930

1,755,277

UNITED STATES PATENT OFFICE

PETER C. STAUP, OF SHEFFIELD, ALABAMA

SEPARATING AND GRADING MACHINE

Application filed June 7, 1927. Serial No. 197,174.

This invention relates to improvements in separating and grading apparatus and more particularly to a machine for use in separating nuts from twigs, leaves, and other trash and for grading the nuts according to size.

In gathering nuts, they are ordinarily shaken from the trees onto sheets of canvas stretched beneath the trees and when the trees are shaken, leaves, twigs, parts of branches, and other trash will fall with the nuts and considerable time and labor must be spent in separating the nuts from the trash. Therefore the present invention has as its primary object to provide a machine which will perform this task automatically and expeditiously.

Another object of the invention is to provide a machine for the purpose stated of simple construction and capable of operating in a manner to thoroughly disintegrate the mass of material to be separated, namely the nuts and the trash, deposited therein, so as to obviate the loss of nuts by reason of failure to be separated from the trash.

The machine embodying the invention includes a vibratory and reciprocating screen and means for imparting motion to the screen, and another object of the invention is to provide, in connection with the screen surface, means for effecting automatic alinement of twigs and pieces of branches with the screen wires in the event of the said twigs or pieces of branches assuming a transverse position upon the screen wires which would otherwise tend to clog the machine and interfere with its proper operation.

Another object of the invention is to provide, in a machine of the class described, a novel arrangement whereby screens of different sizes may be substituted one for another depending upon the size of the nuts to be graded.

Another object of the invention is to provide novel means for imparting vibratory motion to the screen as it is reciprocated so as to insure of thorough agitation and disintegration of the mass of material deposited thereon.

In the accompanying drawings:

Fig. 1 is a side elevation of the machine embodying the invention;

Fig. 2 is a vertical front to rear sectional view therethrough;

Fig. 3 is a top plan view of the machine, one corner of the screen frame being broken away;

Fig. 4 is a vertical transverse sectional view taken substantially on the line 4—4 of Figure 1 looking in the direction indicated by the arrows.

Fig. 5 is a similar view taken on the line 5—5 of Figure 1 looking in the direction indicated by the arrows.

The machine embodying the invention includes, in its construction, a frame which is indicated in general by the numeral 1 and which comprises front and rear pairs of corner uprights indicated respectively by the numerals 2 and 3, these uprights being connected and relatively braced at their upper ends by rails 4 and at their lower ends by other rails 5. The uprights 2 are braced with respect to each other by upper and lower rails 6 and 7 and the rear uprights 3 are relatively braced by upper and lower rails 8 and 9. The numeral 10 indicates a hopper which is mounted at its bottom upon the upper rail 8 and is likewise supported upon cross bars 11 and 12 which extend between the upper rails 4, these cross bars constituting respectively the front and rear members of a screen frame, the end members of which frame are indicated by the numeral 13. The frame is supported between the top rails 4, and the bottom of the hopper 10 is provided with an opening 14 which registers with the opening in the frame. Screen wires 15 are secured at their ends to the front and rear faces of the cross bars 11 and 12 respectively and extend beneath these bars and in a front to rear direction and parallel to each other and serve to collect and retain relatively long lengths of branches and likewise long twigs for permitting the passage of shorter lengths of such trash.

The numeral 16 indicates vertically disposed side boards which are mounted in downwardly and forwardly inclined position extending between the respective ones of the corner uprights 2 and 3 at the opposite sides of the frame, and track rails 17, which may be in the nature of wooden beams, are secured to the opposing sides of the boards 16 along the lower edge portions thereof and support the screen holding frame of the machine as will presently be explained.

The screen holding frame of the machine is of sheet metal and is indicated in general by the numeral 18 and the said frame comprises side members 19 and front and rear end members 20 and 21, the frame being of rectangular form and having its walls formed at their lower ends with inwardly projecting supporting flanges 22. The numerals 23 and 24 indicate screens which are removably mounted within the screen holding frame 18, and the screen 23 comprises a rectangular frame including sides 25, a rear end 26, and a front end 27, the frame being removably fitted into the upper portion of the screen holding frame 18 with its sides 25 engaging the sides 19 of the said frame 18 and with its rear end 26 abutting against the rear end 21 of said frame 18, the lower edges of the walls of the frame 23 resting upon the flanges 22 as clearly shown in Figures 2 and 5 of the drawings. A sheet metal cross piece 28, preferably of hollow form and having a front wall parallel to the front wall 27 of the screen frame 23, and a rear wall inclined downwardly and rearwardly from the upper portion of the front wall, is secured at its ends to the side walls 25 of the screen frame 23 and extends transversely of the said frame, the cross piece being provided at one or more points at its upper edge with an upwardly projecting pin 29 which serves a purpose to be presently explained. The screen members of the screen 23 are indicated by the numeral 30, and as will be observed by reference to Figure 5 of the drawings, each of these screen members comprises a bar which is vertically disposed within the frame of the screen and which is decreased in thickness from its upper to its lower edge so that its opposite side faces are downwardly converged and meet at the lower edge of the bar. These bars are arranged parallel to one another and are spaced apart a suitable distance to serve the purpose of the invention, and by reference to the several figures of the drawings it will be observed that the bars extend between, and are supported by, the rear and front ends 26 and 27 of the frame of the screen, and through the cross piece 28, the upper edge of the cross piece and the upper edges of the said bars occupying a common plane. The screen 24 likewise comprises a rectangular frame including side members 31 and front and rear end members 32 and 33 respectively. This screen is disposed within the frame 18 in advance of the screen 23 and with the side members 31 in contact with the side members 18 of the screen holding frame 18 and with the front wall 32 in contact with the front wall 20 of the said frame 18, the rear wall 33 of the frame of the screen 24 abutting against the front wall 27 of the frame of the screen 23, as clearly shown in Figures 2, 3 and 4 of the drawings. The screen members of the screen 24 are indicated by the numeral 34 and correspond to the members 30 of the screen 23 and are similarly arranged except that they are spaced apart a distance greater than the spacing of the members 30 of the said screen 23 as clearly shown in Figures 3 and 4 of the drawings.

The screen holding frame 18 is supported for reciprocation upon the track rails 17 by suitable wheels 35 which are journaled upon stub shafts projecting from the side members 19 of the frame and it will be evident by reference to Figure 4 of the drawings that the frame is guided in its reciprocatory movement between the side boards 16 of the frame structure. Series of front and rear abutments 36 and 37 are mounted upon the upper side of each track rail 17 and corresponding abutments of the two series upon each rail are spaced apart a distance substantially equal to the spacing of the wheels 35 and are so positioned as to be in the path of travel of the wheels in the reciprocatory motion of the screen frame on the track rails 17, it being understood that as the wheels ride over the abutments, which abutments have arcuate upper sides, vibratory motion will be imparted to the screen frame due to the impact of the wheels with the abutments.

In order that reciprocatory motion may be imparted to the screen frame, a shaft 38 is journaled in suitable bearings upon the rear corner uprights 3 and is provided with a crank 39 to which is connected one end of a pitman rod 40, the other end of the rod being connected as at 41 to the rear end member 21 of the frame 18. A crank handle 42 is provided upon one end of the shaft 38 and constitutes means whereby the shaft may be manually rotated, or if desired, mechanical power may be applied to the shaft from any suitable motor and by any suitable arrangement of gearing.

In the operation of the machine, rotary motion is imparted to the shaft 38 and this will result in reciprocatory motion being imparted to the screen frame 18. The nuts and trash mixed therewith as shaken from the tree and gathered on the canvas stretched beneath the tree is introduced into the hopper 10 and passes through the opening 14 and onto the screen 15 where the larger pieces of trash will accumulate and may be removed from time to time as occasion may require. The smaller pieces of trash and the nuts will pass through the screen comprising the screen wires 15 and fall onto the screen 23 comprising the bars 30 and these bars are so spaced that the trash will pass between the same but the nuts of all sizes will be retained upon the screen. As the screen is reciprocated, it will at the same time be vibrated as previously explained and the trash will fall through the screen and into a trash box 43 arranged beneath the screen frame. The nuts will in the meanwhile travel down the screen and any twigs or particles of branches which become lodged transversely on the screen members 26 will be engaged by the pin 29 and caused to assume a position parallel to said members and fall between the same so that the machine will not become clogged. The nuts will travel downwardly along the screen members 30 and onto the members 30 of the screen 24 where the nuts which have lost their shucks will pass between the members 30 and into a nut receiving box 44, while the nuts which are still in their shucks will travel downwardly and be delivered to a basket 45 arranged at the front of the machine.

A baffle plate 46 is secured to the under side of the screen holding frame 18 and extends transversely between the lower edges of the side members 19 of said frame, this plate being located to extend forwardly beyond the plane which will be occupied by the rear wall 33 of the screen 24 when the said screen is in place within the frame 18, as clearly shown in Figure 2 of the drawings, so as to prevent any of the nuts which are delivered from the screen 24, dropping into the trash box 43 or between said box and the nut receiving box 44.

A baffle plate 47, similar to the plate 46, is secured to the under side of the front wall 20 of the frame 18 and projects forwardly beyond the forward end of the said frame and serves to insure of delivery of the nuts which are still in their shucks, into the basket 45 and prevent these nuts entering the box 44 which is designed to receive the nuts from which the shucks have been shed.

It will be understood from the foregoing description of the invention that the screens 23 and 24 may be made in different sizes or in other words may have their screen members spaced apart different distances, so that there may be a desirable interchange of the screens of different sizes in accordance with the average sizes of the nuts to be separated.

It is to be understood, of course, that various changes may be made, within the scope of what is claimed, without departing from the spirit of the invention.

Having thus described the invention, what I claim is:

In a machine of the class described, a frame, a screen mounted in the frame, means for imparting reciprocatory movement to the screen, the screen including a frame and screen bars extending longitudinally therein, a cross piece extending within the said screen frame transversely of the screen bars with its upper edge substantially in the plane of the upper edges of the screen bars, and a trash engaging finger extending upwardly from the cross piece intermediate its ends and above the plane of the screen bars to engage and longitudinally dispose trash lodging transversely on the screen bars.

In testimony whereof I affix my signature.

PETER C. STAUP.